(12) United States Patent
Bu et al.

(10) Patent No.: US 11,154,954 B2
(45) Date of Patent: Oct. 26, 2021

(54) WELDING BASE

(71) Applicant: COMBA TELECOM TECHNOLOGY (GUANGZHOU) LIMITED, Guangzhou (CN)

(72) Inventors: Binlong Bu, Guangzhou (CN); Peitao Liu, Guangzhou (CN); Jianjun You, Guangzhou (CN); Hongbin Duan, Guangzhou (CN); Lijing Peng, Guangzhou (CN)

(73) Assignee: COMBA TELECOM TECHNOLOGY (GUANGZHOU) LIMITED, Guangzhou (CN)

( * ) Notice: Subject to any disclaimer, the term of this patent is extended or adjusted under 35 U.S.C. 154(b) by 268 days.

(21) Appl. No.: 16/463,466

(22) PCT Filed: May 23, 2017

(86) PCT No.: PCT/CN2017/085505
§ 371 (c)(1),
(2) Date: May 23, 2019

(87) PCT Pub. No.: WO2018/094987
PCT Pub. Date: May 31, 2018

(65) Prior Publication Data
US 2019/0366490 A1 Dec. 5, 2019

(30) Foreign Application Priority Data

Nov. 23, 2016 (CN) .......................... 201611047466.2

(51) Int. Cl.
*B23K 1/00* (2006.01)
*B23K 37/04* (2006.01)
(Continued)

(52) U.S. Cl.
CPC ............ *B23K 37/0461* (2013.01); *B23K 1/00* (2013.01); *B23K 37/06* (2013.01); *H01R 4/027* (2013.01); *H01R 4/028* (2013.01)

(58) Field of Classification Search
CPC ................ B23K 37/0461; B23K 37/06; B23K 2101/38; B23K 1/0016; B23K 33/00; B23K 2101/36–42; H01R 4/027; H01R 4/028
See application file for complete search history.

(56) References Cited

U.S. PATENT DOCUMENTS

| 1,451,041 | A | * | 4/1923 | Hyde | ...................... | B23P 15/00 |
| | | | | | | 228/170 |
| 2,263,166 | A | * | 11/1941 | Darvie | ..................... | B23K 1/00 |
| | | | | | | 403/272 |

(Continued)

FOREIGN PATENT DOCUMENTS

| CN | 101362243 A | 2/2009 |
| CN | 201336770 Y | 10/2009 |

(Continued)

*Primary Examiner* — Kiley S Stoner
(74) *Attorney, Agent, or Firm* — Kilpatrick Townsend & Stockton LLP

(57) ABSTRACT

The disclosure relates to the field of welding technology. A welding base includes a welding groove defined therein. A limiting member is arranged inside the welding groove for preventing solder and to-be-welded member from loosening from the welding groove after the to-be-welded member is welded to the welding joint. Based on the prior art welding base, the inside of the welding groove of the present disclosure is provided with a limiting member, which can prevent the solder from a longitudinal movement, thus preventing the solder from falling off the welding groove.

5 Claims, 2 Drawing Sheets

(51) Int. Cl.
*B23K 37/06* (2006.01)
*H01R 4/02* (2006.01)

(56) References Cited

U.S. PATENT DOCUMENTS

| | | | | |
|---|---|---|---|---|
| 2,290,934 A * | 7/1942 | Andreasson | B23B 51/06 | 76/108.1 |
| 2,664,844 A * | 1/1954 | Siegrist | H01R 4/022 | 228/56.3 |
| 3,055,097 A * | 9/1962 | Douglas | B62K 19/32 | 228/126 |
| 3,076,164 A * | 1/1963 | Ullman | H05K 3/4046 | 439/55 |
| 3,156,517 A * | 11/1964 | Maximoff | H01R 12/58 | 439/743 |
| 3,553,635 A * | 1/1971 | Lundergan et al. | H01R 4/4818 | 439/853 |
| 3,828,706 A * | 8/1974 | Scott | H01R 43/16 | 29/879 |
| 3,957,338 A * | 5/1976 | Maximoff | H01R 12/58 | 439/853 |
| 4,090,656 A * | 5/1978 | Sato | B23K 3/02 | 228/180.1 |
| 4,385,795 A * | 5/1983 | Endoh | H01R 12/79 | 439/494 |
| 5,028,162 A * | 7/1991 | Tsuno | C04B 37/026 | 403/30 |
| 5,071,372 A * | 12/1991 | Viselli | H01R 12/724 | 439/733.1 |
| 5,073,126 A * | 12/1991 | Kikuchi | H01R 4/245 | 439/452 |
| 5,192,228 A * | 3/1993 | Collins | H01R 13/658 | 439/567 |
| 5,653,601 A * | 8/1997 | Martucci | H01R 4/028 | 439/82 |
| 5,739,498 A | 4/1998 | Sunamoto et al. | | |
| 6,080,936 A * | 6/2000 | Yamasaki | H01R 43/0235 | 174/263 |
| 6,121,576 A * | 9/2000 | Hembree | H01L 25/50 | 219/209 |
| 6,312,287 B1 * | 11/2001 | Harting | H01R 9/0515 | 439/581 |
| 6,324,754 B1 * | 12/2001 | DiStefano | H01L 24/81 | 29/840 |
| 6,493,932 B1 * | 12/2002 | Haba | H05K 3/326 | 228/180.21 |
| 6,604,669 B1 * | 8/2003 | Syslak | B23K 1/0012 | 228/166 |
| 6,623,283 B1 * | 9/2003 | Torigian | H01R 43/0256 | 439/83 |
| 7,695,287 B2 * | 4/2010 | Smith | H05K 3/32 | 439/70 |
| 8,162,203 B1 * | 4/2012 | Gruber | H01L 24/11 | 228/256 |
| 2008/0268676 A1 * | 10/2008 | Zanolli | H01R 4/028 | 439/83 |
| 2010/0136807 A1 * | 6/2010 | Appel | H05K 1/0256 | 439/83 |
| 2012/0156939 A1 * | 6/2012 | Ju | H01R 12/7082 | 439/660 |
| 2012/0178306 A1 * | 7/2012 | Ju | H05K 7/1069 | 439/660 |
| 2013/0045639 A1 * | 2/2013 | Zhang | H01R 12/57 | 439/660 |
| 2014/0024232 A1 * | 1/2014 | Wehrle | H01R 12/91 | 439/83 |
| 2016/0072198 A1 * | 3/2016 | Tsai | H01R 13/41 | 439/877 |
| 2018/0127269 A1 * | 5/2018 | Long | B81C 1/00301 | |

FOREIGN PATENT DOCUMENTS

| | | |
|---|---|---|
| CN | 105186253 A | 12/2015 |
| CN | 105470662 A | 4/2016 |
| CN | 106363312 A | 2/2017 |
| CN | 206277044 U | 6/2017 |
| JP | 2005014008 A | 1/2005 |

* cited by examiner

WELDING BASE

CROSS-REFERENCE TO RELATED APPLICATIONS

This application is a national stage of International Application No. PCT/CN2017/085505, filed on May 23, 2017, which claims priority to the Chinese Application No. 201611047466.2, filed on Nov. 23, 2016, both are hereby in cooperated by reference in their entities.

FIELD OF THE DISCLOSURE

The disclosure relates to the field of welding technology, in particular to a welding base for preventing solder from falling off.

BACKGROUND OF THE DISCLOSURE

In prior art welding technology, the phenomenon that the solder falls off from the welding base is common. Especially in surface welding or in welding joint welding technology with a welding groove, the to-be-welded body is easy to fall off from the welding base carrying solder. For the welding between the aluminum welding base and coaxial cable (the to-be-welded body), coating is generally needed, usually by spraying a layer of copper in the welding groove of the aluminum-welding base, that is, copper coating. Although copper coating is done and connection between the aluminum base and coaxial cable is relatively strong after welding, its vibration resistance and tensile strength are still weak. When the welding joint is subjected to large vibration or the coaxial cable is pulled hard, the coaxial cable is easy to fall off from the welding groove of the welding base carrying soldering tin (the solder).

Please refer to FIGS. 1-2 for details. FIG. 2 is a cross-sectional view of a welding joint of a welding base shown in FIG. 1. FIG. 1 shows a case where the coaxial cable 1 is welded to a solder joint 2 of an aluminum welding base. In FIG. 2, an outer conductor 3 of the coaxial cable 1 and the aluminum-welding groove 5 are welded and fixed together by solder 4. If the device vibrates or the cable is pulled hard, it will cause the solder 4 at the welding joint to fall off the welding groove 5. It can be seen that the traditional welding is not strong, the reliability is poor, and there are potential safety hazards.

SUMMARY OF THE DISCLOSURE

The present disclosure aims to solve the technical problem that the welding point is not strong and the solder is easy to fall off in the welding method of the prior art, and provide a welding base in which the solder at the welding joint cannot fall off from the welding groove, so that the welded structure is firm and reliable.

A welding base includes a welding groove defined therein. A limiting member is arranged inside the welding groove for preventing solder and to-be-welded member from loosening from the welding groove after the to-be-welded member is welded to the welding base.

In one embodiment, the limiting member is laterally disposed at a top end of the welding groove and extends to an inner side, or the limiting member is disposed on an inner sidewall of the welding groove.

In one embodiment, at least one pair of the limiting members is disposed, and each pair of the limiting members is oppositely disposed at the same height on the welding groove.

In one embodiment, a plurality of the limiting members is disposed, and the plurality of the limiting members is disposed on the inner side of the welding groove at equal or unequal heights.

In one embodiment, the limiting member is integrally formed with the welding groove, or the limiting member is a separate component, and the limiting member is clasped at a top end of the welding groove and extends to the inner side thereof, or the limiting member is clasped on the inner side-wall of the welding groove.

In one embodiment, the inside of the welding groove is provided with a T-shaped slit, and the limiting member is T-shaped and is clasped at the T-shaped slit such that one end thereof laterally passes through from the T-shaped slit.

In one embodiment, the cross section of the welding groove is arcuate or rectangular.

In one embodiment, the welding base is made of a metal material or a metal alloy material.

Compared with the prior art, the present disclosure has the following advantages.

Based on the prior art welding base technology, the inside of the welding groove of the welding base of the present disclosure is provided with a limiting member, which can prevent the solder from falling off the welding groove. During the welding process, the solder melts and flows into the welding groove, and the solder cools such that the welding groove and to-be-welded member are welded together. In addition, the cooled solid solder is fixed by the limiting member and is not easy to fall off, thus solving the technical problem that the welding point is not strong and the solder is easy to fall off in the prior art welding scheme.

Additional aspects and advantages of the disclosure will be set forth in part in the description or embodiments which will follow.

BRIEF DESCRIPTION OF THE DRAWINGS

In order to more clearly illustrate the technical solution in the embodiments of the present disclosure, a brief introduction of the drawings used in the embodiments or the prior art will be briefly described below. It is apparent that the drawings in the following description are only some embodiments of the present disclosure, but the present disclosure is not limited thereto.

DETAILED DESCRIPTION OF THE DISCLOSURE

Figure 1:
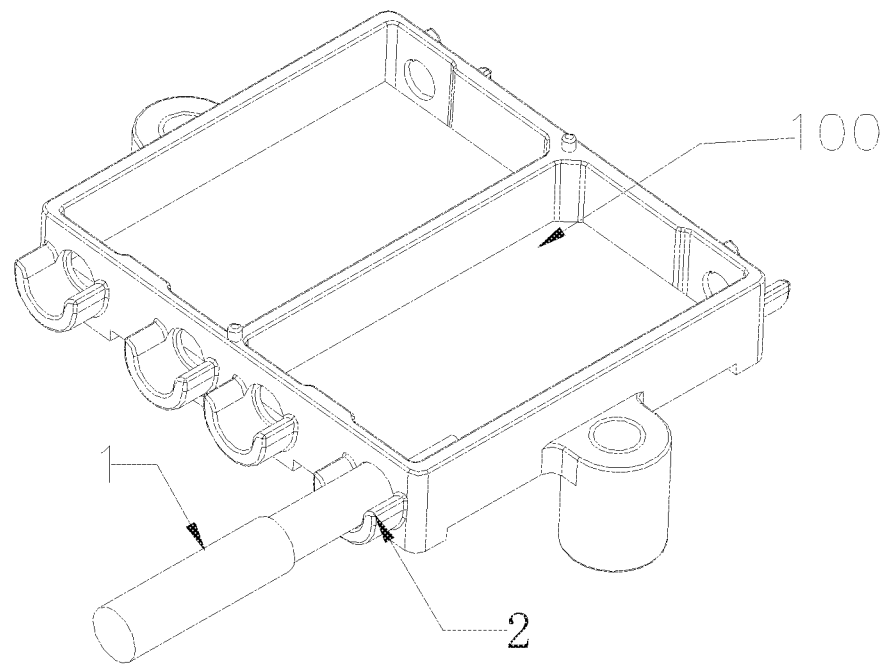
FIG. 1 is a perspective view of a prior art welding base with a welding groove and a coaxial cable, which are welded together.
Figure 2:
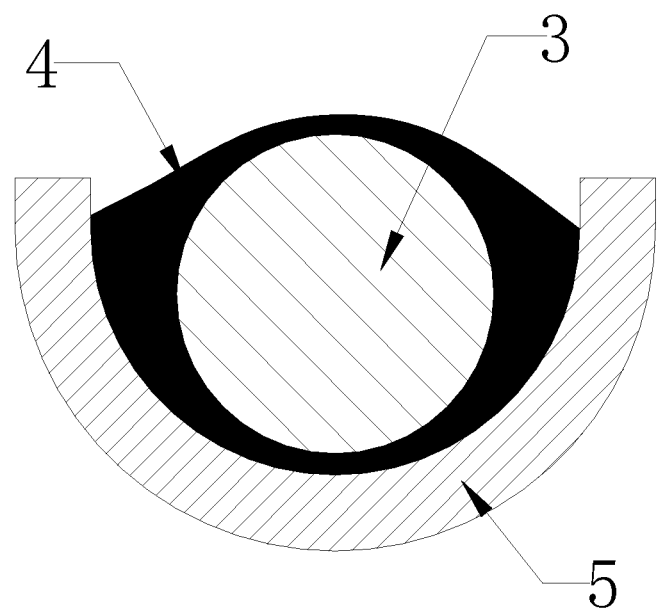
FIG. 2 is a cross-sectional view of a welding joint of the welding base shown in FIG. 1.

The disclosure is further described in the following with reference to the drawings and exemplary embodiments, which are illustrated in the accompanying drawings, in which the same or similar reference numerals are used to refer to the same or similar elements or elements having the same or similar functions. The embodiments described below with reference to the drawings are intended to be illustrative of the disclosure and are not to be construed as limiting. Further, if a detailed description of a known technique is not necessary to show the features of the present disclosure, it will be omitted.

It should be noted that in view of problem that the solder of a prior art welding base easily fall off from the welding joint, in the welding base of present disclosure, improvements are made upon the welding joint. That is to say, the welding base of the present disclosure has the same structure as the prior art welding base, except for the welding joint. Thus, for ease of illustration, FIGS. 3 and 4 only show the structure of the welding base of the present disclosure at the welding joint.

Figure 3:
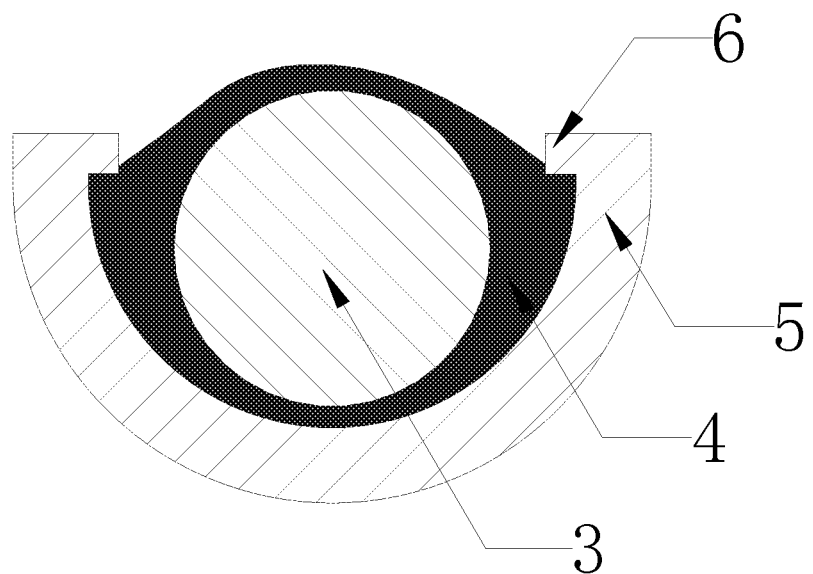
FIG. 3 is a cross-sectional view showing a welding joint of a welding base in an embodiment of the present disclosure.
Figure 4:
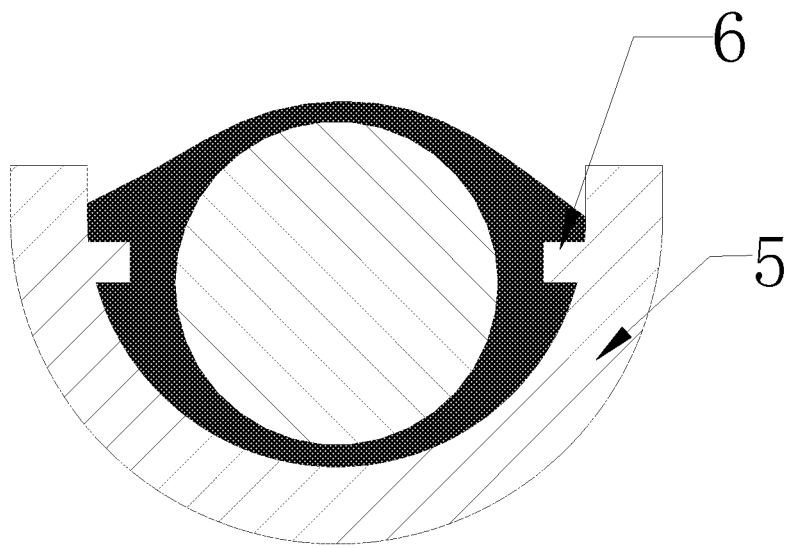
FIG. 4 is a cross-sectional view showing a welding joint of a welding base in another embodiment of the present disclosure.

Referring to FIGS. 3 and 4, the present disclosure provides a welding base 100 for preventing solder 4 from falling off from a welding joint, thereby ensuring reliability of the connection between the to-be-welded member 3 and the welding base 100. The welding base 100 is provided with a welding groove 5 at the welding joint for accommodating the to-be-welded member 3 and the solder 4. The to-be-welded member 3 is welded in the welding groove 5. The limiting groove 6 is defined in the welding groove 5 for preventing the solder 4 and the to-be-welded member 3 from loosening from the welding groove 5. Specifically, the limiting member 6 is disposed inside the welding groove 5.

In one embodiment, the limiting member 6 has a strip shape, extends along a longitudinal direction of the welding groove 5 and is laterally disposed at a top end of the welding groove 5 and extends to the inside of the welding groove. Therefore, the soldered solder 4 is limited on the inside thereof, and even if the solder 4 is loosened, it cannot be detached from the welding groove 5 in the longitudinal direction of the welding groove 5, so that the connection between the to-be-welded member 3 and the welding base 100 is safe and reliable.

In another embodiment, the strip-shaped limiting member 6 is laterally disposed on an inner side-wall of the welding groove 5, In one embodiment disposed in a middle position along the longitudinal direction inside the welding groove 5. As a result, after the welding is completed, the limiting member 6 is wrapped by the solder 4 to hold the solder 4 in place, and even if the solder 4 is loosened, it cannot move longitudinally along the welding groove 5, thereby preventing the solder 4 from falling out of the welding groove 5.

Of course, the strip-shaped limiting member 6 can also be disposed inside the welding groove 5 at a different angle defined by its plane relative to a horizontal plane.

In other embodiments, the limiting member 6 has a block shape or dot shape, and having these shapes can also prevent the solder 4 from loosening and falling off. In addition, the limiting member 6 is annular, and the molten solder 4 flows into an annular space and solidifies, which is better for limiting the longitudinal movement of the solder 4.

In one embodiment, a plurality of the limiting members 6 is provided, and the plurality of limiting members 6 is configured in pairs and is oppositely disposed inside the welding groove 5. Specifically, each pair of limiting members 6 are disposed at the same or substantially the same height inside the welding groove 5, thereby fixing the solder 4 from both sides of the welding groove 5 to ensure the connection between the to-be-welded member 3 and the welding base 100.

In another embodiment, the plurality of limiting members 6 is disposed inside the welding groove 5 at equal or unequal heights; for example, the plurality of limiting members 6 is spirally disposed inside the welding groove 5.

In other embodiments, the plurality of limiting members 6 is dispersedly distributed inside the welding groove 5.

In one embodiment, the limiting member 6 is integrally formed with the welding groove 5, so that the connection between the limiting member 6 and the welding groove 5 is firm, and the process of assembling the limiting member 6 and the welding groove 5 is avoided, thus leading to convenience in mass manufacturing.

In other embodiments, the limiting member 6 can also be a separate component and disposed inside the welding groove 5. For example, a T-shaped slit may be formed inside the welding groove 5 (not shown, the same applies hereinafter). The limiting member 6 is a T-shaped member and is clasped in the T-shaped slit, and one end of the limiting member 6 passes through the T-shaped slit, thereby forming a restriction to the solder 4.

In one embodiment, the welding base 100 is made of a metal material or a metal alloy material.

The specific implementation process of the present solution is as follows. During the welding process, the solder 4 (e.g. soldering tin) melts and flows into the welding groove 5, and the solder 4 is cooled to form a solid, such that the welding groove 5 and the to-be-welded member are welded together. As the limiting member 6 is provided, the cooled solder 4 is clasped by the limiting member 6 and is not easily detached. Even if the joint between the solder 4 and the welding groove 5 is loosened, because the limiting member 6 is stuck with the solder 4, the solder 4 and the to-be-welded member cannot be detached from the welding joint of the welding groove 5, and thus it is safe and reliable.

In a summary, based on the prior art welding base 100, the inside of the welding groove 5 of the present disclosure is provided with a limiting member 6, which can prevent the solder 4 from having longitudinal movements, thus preventing the solder 4 from falling off the welding groove 5. During the welding process, the solder 4 melts and flows into the welding groove 5, and the solder 4 cools such that the welding groove 5 and to-be-welded member are welded together. In addition, the cooled solid solder 4 is fixed by the limiting member 6 and is not easy to fall off, thus solving the technical problem that the welding point is not strong and the solder 4 is easy to fall off in the prior art welding scheme.

While the disclosure has been described in detail, the embodiments of the disclosure may be practiced without these details. In some embodiments, well-known methods, structures, and techniques have not been shown in detail so as not to obscure the understanding of the present specification.

What is claimed is:

1. A soldering base comprising:
a soldering groove defined in a soldering joint of the soldering base, wherein a pair of limiting members is arranged inside the soldering groove for preventing solder and a to-be soldered member from loosening and falling off from the soldering groove after the to-be soldered member is soldered to the soldering base, the pair of the limiting members are respectively provided on two inner side walls of the soldering groove, the lateral distance between the pair of the limiting members and the lateral distance between the two inner side walls of the soldering groove are both larger than the diameter of the to-be-soldered member; and during the soldering process, the solder melts and flows into the soldering groove, and after the solder cools, a solid solder is formed, so that the soldering groove and the to-be-soldered member are fixed as a whole, and the pair of the limiting members are wrapped by the solid solder, wherein the cooled solid solder is held by the pair of the limiting members without falling off.

2. The soldering base as recited in claim 1, wherein the pair of the limiting members is oppositely disposed at the same height on the soldering groove.

3. The soldering base as recited in claim 1, wherein the pair of the limiting members is integrally formed with the soldering groove.

4. The soldering base as recited in claim 1, wherein a cross section of the soldering groove is arcuate or rectangular.

5. The soldering base as recited in claim 1, wherein the soldering base is made of a metal material or a metal alloy material.

\* \* \* \* \*